(12) United States Patent
Salovirta

(10) Patent No.: US 11,399,523 B2
(45) Date of Patent: *Aug. 2, 2022

(54) FISHING DEVICE

(71) Applicant: Hannu Salovirta, Espoo (FI)

(72) Inventor: Hannu Salovirta, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/825,936

(22) Filed: Mar. 20, 2020

(65) Prior Publication Data

US 2020/0214276 A1 Jul. 9, 2020

Related U.S. Application Data

(62) Division of application No. 13/264,297, filed as application No. PCT/FI2010/050299 on Apr. 14, 2010, now Pat. No. 10,624,324.

(30) Foreign Application Priority Data

Apr. 14, 2009 (FI) .................................. 20095405

(51) Int. Cl.
*A01K 85/12* (2006.01)
*A01K 85/18* (2006.01)
*A01K 85/00* (2006.01)

(52) U.S. Cl.
CPC ............ *A01K 85/12* (2013.01); *A01K 85/122* (2022.02); *A01K 85/128* (2022.02); *A01K 85/18* (2013.01); *A01K 85/1871* (2022.02); *A01K 85/1881* (2022.02); *A01K 85/1883* (2022.02)

(58) Field of Classification Search
CPC ........ A01K 85/00; A01K 85/10; A01K 85/12; A01K 85/122; A01K 85/125; A01K 85/128; A01K 85/18; A01K 85/1871; A01K 85/1881; A01K 85/1883; A01K 85/1887; A01K 85/1891
USPC ............. 43/42.14, 42.19, 42.2, 42.21, 42.15, 43/42.11, 42.16, 42.17, 42.18
See application file for complete search history.

(56) References Cited

U.S. PATENT DOCUMENTS

| | | | |
|---|---|---|---|
| 315,967 A * | 4/1885 | Spencer | A01K 85/12 43/43.15 |
| 418,200 A * | 12/1889 | Loftie | A01K 85/10 43/42.36 |
| 496,441 A * | 5/1893 | Pepper, Jr. | A01K 85/12 43/42.28 |
| 771,116 A | 9/1904 | Barnhart | |

(Continued)

FOREIGN PATENT DOCUMENTS

| | | | | |
|---|---|---|---|---|
| DE | 29704961 U1 * | 8/1997 | | A01K 85/08 |
| FR | 948783 A * | 8/1949 | | |

(Continued)

*Primary Examiner* — Darren W Ark
(74) *Attorney, Agent, or Firm* — Skinner and Associates; Joel Skinner

(57) ABSTRACT

Fishing device, such as a lure (1), in which there is a body (2), to the front end of which are attached means (3) for attaching a line (4) and at the rear end of which are winglets (11, 12) that rotate due to the force of the water flow. The winglets (11, 12) are mounted eccentrically on bearings on an essentially wire-like axle (9) to rotate in opposite directions and/or at different speeds. The winglets (11, 12) are essentially triangular, the bearing point being essentially at, or in the immediate vicinity of one point of the triangle.

1 Claim, 2 Drawing Sheets

(56) References Cited

U.S. PATENT DOCUMENTS

Figure 1:
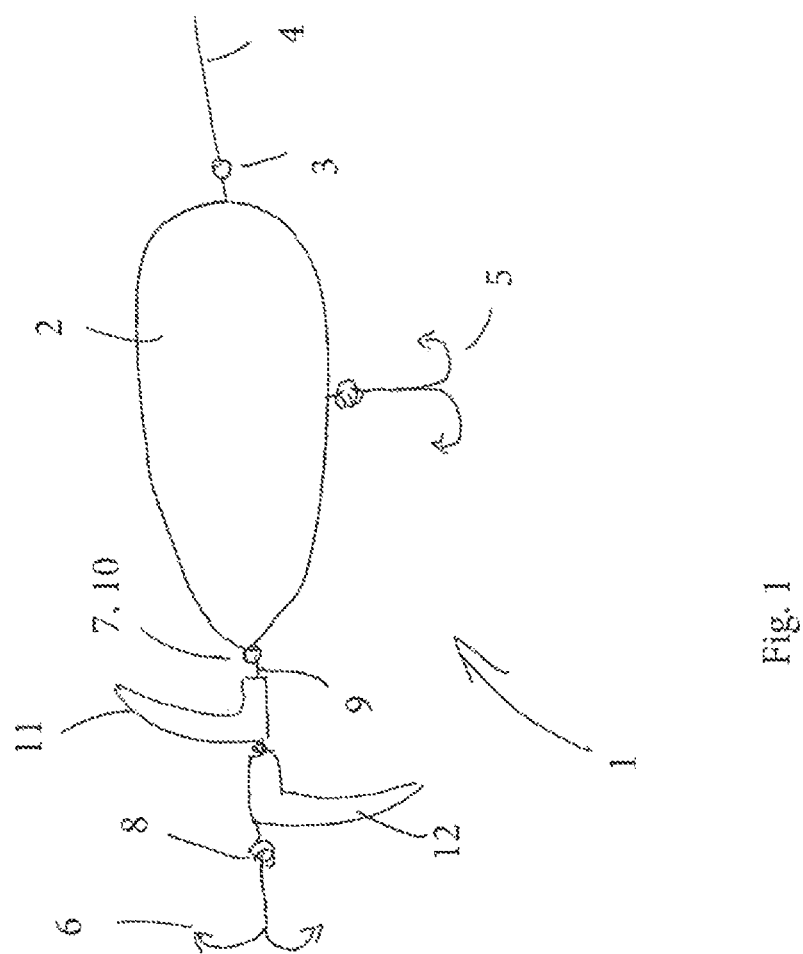

| | | | | |
|---|---|---|---|---|
| 831,831 | A * | 9/1906 | Clippinger | A01K 85/16 43/42.15 |
| 865,676 | A | 9/1907 | Brown | |
| 1,140,279 | A * | 5/1915 | Myers | A01K 85/10 43/42.36 |
| 1,503,901 | A * | 8/1924 | Jones, Jr. | A01K 83/06 43/44.2 |
| 1,620,972 | A * | 3/1927 | Hobbs | A01K 85/10 43/42.32 |
| 1,795,205 | A * | 3/1931 | Fenderson | A01K 85/00 43/43.13 |
| 1,897,529 | A * | 2/1933 | Palmer | A01K 85/12 43/42.2 |
| 2,212,294 | A * | 8/1940 | Larzelere | A01K 85/10 43/42.14 |
| 2,306,640 | A * | 12/1942 | Nelson | A01K 85/00 43/42.14 |
| 2,569,057 | A * | 9/1951 | Hinerman | A01K 85/12 43/42.14 |
| 2,585,494 | A * | 2/1952 | Aade | A01K 85/14 43/42.49 |
| 2,598,965 | A * | 6/1952 | Bain | A01K 85/12 D22/128 |
| 2,610,429 | A * | 9/1952 | Thomas | A01K 85/12 D22/128 |
| 2,722,079 | A * | 11/1955 | Johnson | A01K 85/10 43/42.14 |
| 2,835,999 | A * | 5/1958 | Gillian | A01K 85/12 43/42.21 |
| 2,895,253 | A * | 7/1959 | Hess | A01K 85/12 D22/129 |
| 2,902,791 | A | 9/1959 | Woodley | |
| 3,137,959 | A * | 6/1964 | Wernett | A01K 85/18 43/43.13 |
| 3,264,774 | A * | 8/1966 | Patterson | A01K 85/10 D22/129 |
| 3,367,059 | A * | 2/1968 | Puls | A01K 85/18 43/42.31 |
| D217,603 | S * | 5/1970 | Self | D22/129 |
| D222,998 | S * | 2/1972 | Harris | 43/42.15 |
| 3,775,892 | A | 12/1973 | Bennetts | |
| 4,501,087 | A * | 2/1985 | Blomquist | A01K 85/14 43/42.06 |
| 4,881,341 | A | 11/1989 | Dickey et al. | |
| 4,891,901 | A * | 1/1990 | Baker, Jr. | A01K 85/00 43/42.11 |
| 5,133,147 | A * | 7/1992 | Benard | A01K 85/00 43/42.13 |
| 6,176,035 | B1 * | 1/2001 | Somogyi | A01K 85/12 43/42.14 |
| 6,536,155 | B1 * | 3/2003 | VanRisseghem | A01K 85/16 43/42.24 |
| 7,895,789 | B2 * | 3/2011 | Langer | A01K 85/18 43/42.11 |
| 8,776,428 | B2 * | 7/2014 | Langer | A01K 85/12 43/42.15 |
| 2003/0145510 | A1 * | 8/2003 | Kohigashi | A01K 85/00 43/42.13 |
| 2004/0049970 | A1 * | 3/2004 | Brown | A01K 85/16 43/42 |
| 2004/0079022 | A1 * | 4/2004 | Owen | A01K 85/10 43/42.09 |
| 2008/0000141 | A1 | 1/2008 | Hair et al. | |
| 2008/0115402 | A1 * | 5/2008 | Helmin | A01K 85/18 43/42 |
| 2008/0202015 | A1 * | 8/2008 | Langer | A01K 85/18 43/42.26 |
| 2019/0246612 | A1 * | 8/2019 | Shunk | A01K 85/18 |
| 2020/0404894 | A1 * | 12/2020 | Szczesny | A01K 85/12 |
| 2021/0120793 | A1 * | 4/2021 | Swanson | H01F 7/08 |
| 2021/0195883 | A1 * | 7/2021 | Want | A01K 85/18 |

FOREIGN PATENT DOCUMENTS

| | | | |
|---|---|---|---|
| FR | 1083780 | 1/1955 | |
| FR | 2662052 A1 * | 11/1991 | |
| GB | 2345624 A * | 7/2000 | A01K 85/00 |
| JP | 2006 115774 A | 5/2006 | |
| JP | 2006197903 A * | 8/2006 | |
| JP | 2017121186 A * | 7/2017 | |
| JP | 2020184980 A * | 11/2020 | |
| RU | 2059363 C1 * | 5/1996 | |
| RU | 2062573 C1 * | 6/1996 | |
| RU | 2065267 C1 * | 8/1996 | |
| SU | 1676561 A1 * | 9/1991 | |
| WO | WO-2007002287 A2 * | 1/2007 | A01K 85/00 |
| WO | WO-2018165506 A1 * | 9/2018 | A01K 85/12 |

* cited by examiner

FISHING DEVICE

This application is a Divisional Application of application Ser. No. 13/264,297, filed Oct. 13, 2011.

The present invention relates to a fishing device and more specifically to a device, which can be most nearly be referred to as a lure.

Though fishing is a sport that demands skill, skills being naturally properties of the fisher, much of fishing's result depends, however, on the domain of fishing tackle.

When a lure is used, no matter whether in trolling or spinning, the lure, which can have quite diverse properties, is attached to a line. A so-called spinner is a metallic, concave piece that rotates in the water around a wire-like axle and is of a colouring and size that are intended to attract a specific species of fish, or fish in general. The hooks attached to the rear of the spinner are intended to catch in the mouth of a fish seizing the spinner. The spinner rotates evenly, depending on the speed at which it is pulled.

A wobbler-type lure on the other hand is a larger type of lure, with an appearance and size that seek to imitate a small fish. A wobbler can be equipped with various plate-like guides, which are intended to keep the lure, which is often made of a material lighter than water, under the surface, though the guides can also be intended to affect the lure's swimming properties. A wobbler can also be equipped with an articulated joint. It is difficult to use guides, such as a so-called nose plate, to guide a wobbler if it has a significant weight. As wobblers are therefore often relatively light, their throwing distance in spinning, on the other hand, is modest.

A problem with the fishing properties in all known solutions is that the fishing part moves unnaturally from the viewpoint of the predatory instinct of a normal fish. In other words, the lure does not move in a manner that would arouse the predatory instincts of a predatory fish, because the motion patterns do not sufficiently resemble the patterns of motion of a prey fish.

A numerous group of various types of lure solutions, in which rotating parts are used, are also known from the prior art. Most of the various types of rotating winglets are intended to attract fish, though in some applications it is also stated that the intention is to stabilize the motion of the lure.

Some known solutions contain two rotating propeller parts. US patent application 2004/0049970 discloses two consecutive propellers, which rotate due to the water flow and which rotate in opposite directions due to their different curvature. The blades are symmetrical relative to the axis of their bearings. The patent discloses that the said blades cause motion, because the water flow is uneven, relative to the body of the lure.

The present invention is intended to create a fishing device, specifically a lure-type fishing device, with the aid of which fish can be caught more effectively than with existing devices, due precisely to the apparently natural movements of the device. The intention is particularly to create a fishing device, the movements of which are no longer random, but are compelled to be of a desired type.

These and other benefits and advantages of the invention are achieved in the manner described as characteristic in the accompanying claims.

In the following, the invention is described in greater detail with reference to the accompanying drawings, in which one embodiment of the invention is shown schematically.

Figure 2:
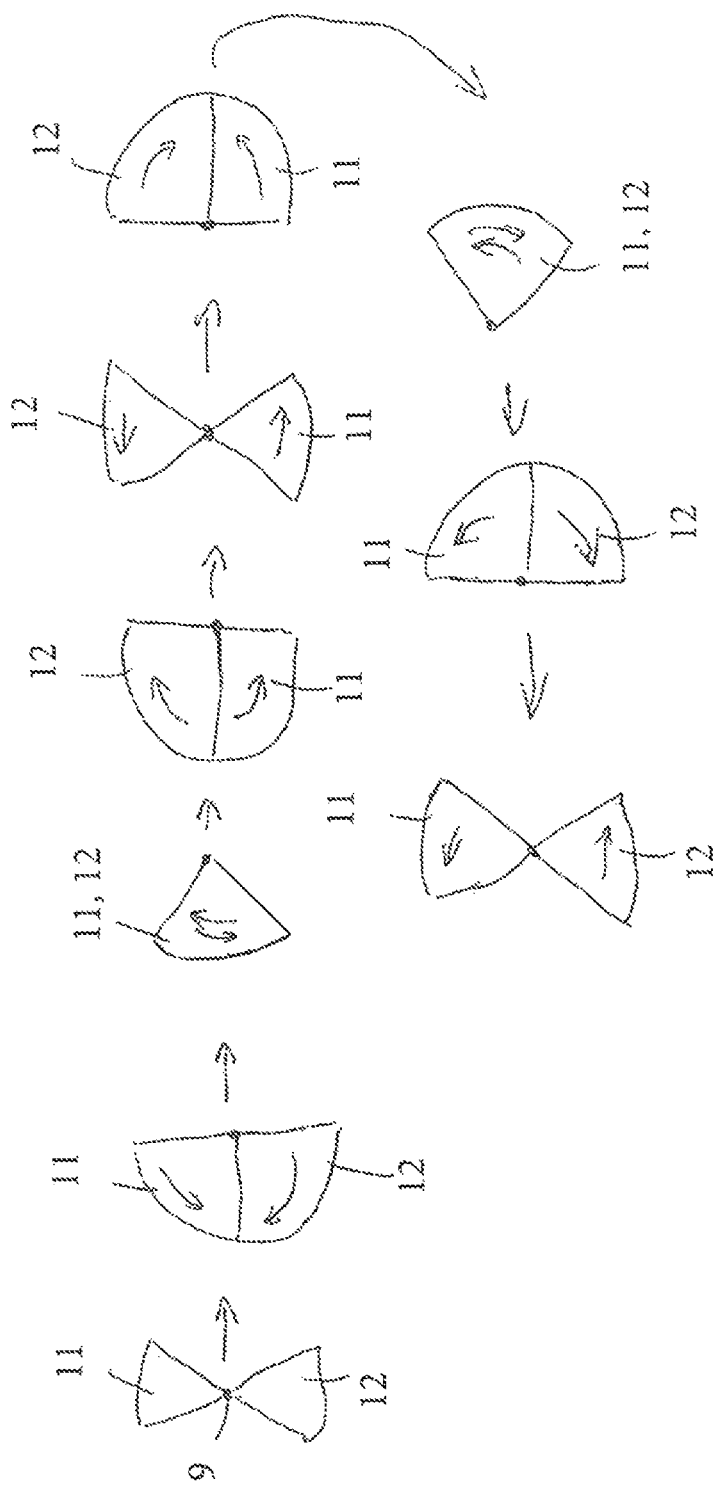

Thus, FIG. 1 shows a side view of a lure according to the invention;

FIG. 2, for its part, shows the arrangement of the winglets of the lure, with its movements seen from directly behind, relative to the direction of travel of the lure.

Thus, FIG. 1 shows a lure-type fishing device 1, in which there is a suitably shaped body 2, possibly resembling a small fish or other bait, which can be made from wood, plastic, or any other material whatever that is conventionally used for manufacturing lures. The body part 2 can be equipped with a coating, which can be suitably coloured, as is the manner in this field, and weights or other auxiliary components, such as guide plates, can be added to it, if necessary.

In the usual manner, in the front part of the body there is a suitable loop 3, to which a line 4 for pulling the lure is attached. Depending on the weight distribution of the body, the line 4 may be attached in different parts of the body, however, normally in the very front part of the same. A sufficient number of hooks 5, 6 are added for catching a fish. The hooks can be attached permanently or movably. One conventional form of movable attachment is to attach to the lure a loop made of wire-like metal, to which the loop of the hook is secured. Of course, various types of spacer pieces can also be used, if desired.

In the rear part of the lure, relative to its direction of travel, is a loop 7 to which a wire-like axle 9 is attached in a freely articulated manner, for example attached to the loop 7 with the aid of a loop 10 at the end of the axle 9. At the rear end of the axle, there is also a loop 8, to which a hook 6 can be attached, if such is used. Any kind of stopper whatever can be used in place of the loop 8, if there is no need to attach a hook.

The winglets 11 and 12 shown are an essential feature of the invention. These winglets are mounted on bearings eccentrically on the axle 9. In particular, the winglets are mounted on bearings on one side, or close to it. The term bearing usually refers to a hole drilled through the winglet. The winglets can be separated from each other or their surroundings by means of suitable beads or bushings.

The winglets are shaped like propellers, so that, when the lure is pulled, the water resistance causes the winglets to rotate in opposite directions around the axle 9.

FIG. 2 shows the movements of the winglets as a series of images. The winglets are approximately shaped as quarter circles, though this is in no way essential.

In the initial situation, the winglets 11,12 are essentially opposite to each other and relative to the axle 9. The water flow causes the winglets to rotate towards each other, forming first a semicircle when seen from behind, which then narrows to become a quarter circle and then widens to become two opposing quarter circles.

What then happens when the lure is pulled? The rotational movement of the winglets mounted in bearings on the axle causes the water resistance to vary greatly and rapidly, causing strong pulses pushing sidewards, so that the axle 9 with the winglets seeks to turn in one direction while at the same time the rear end of the lure seeks to turn correspondingly in the opposite direction. The motion is surprisingly like the rapid movements of the tail of a small fish, which naturally leads to the excellent fishing properties of a lure of this type.

According to the image series shown in FIG. 2, each winglet 11 and 12 has made a complete circle, when the rear part of the lure has caused one swing to the left and one swing to the right. The figure also shows that, in the position in the initial situation, the winglets are symmetrical relative to the axle 9, and in this position cause practically no lateral movements in the body. In all other positions, the effects are asymmetrical and tend to swing the body to one side or the other.

The movements induced in the lure are mainly lateral. Though a certain force also tends to act on the body 2 vertically, the weight of the body keeps this movement quite small, as the lifting force would have to be clearly greater, if a significant vertical movement were to take place. The weight of the body 2 can be adjusted by material selections and, if necessary, by adding weights.

Reference has been made above to essentially quarter-circle-shaped winglets. However, the size of the winglets is not very critical. In fact, by using assemblies with different winglets of varying size, different kinds of swimming property will be achieved. The properties can also be altered by altering the shape of the winglets, for example, by changing the blade pitch. The rotation speed will then naturally change. Obviously the rotation speed of the winglets must not exceed a certain threshold, as higher rotation speeds will probably prevent the lure body from being able to move as desired.

The manufacturing material of the wing lets is especially plastic, which easily worked. The part of the winglet around the axle 9 in the longitudinal direction must be sufficient for the winglet to remain in the desired position.

Otherwise, the winglets can be of a quite thin material. Of course, the winglets can also be easily made from sheet metal.

The size of the lure or the winglets belonging to it can vary considerably, depending on the fish it is intended to catch, as well as on many other factors. It is also possible to make the lure relatively heavy, thus permitting long throws when spinning. The size of the winglets can be proportional to the weight of the lure.

The fishing device according to the invention permits lure fishing in quite shallow waters, because the winglets cause a specific upward force, which naturally tends to lift the lure. It is easy to alter the swimming depth of the device according to the invention by changing the pulling speed.

The above only describes a construction, in which the winglets 11 and 12 rotate in opposite directions. However, though this is certainly quite a good alternative it is not the only one. The winglets can also rotate in the same direction, but then they must rotate at different speeds. A speed difference can be easily realized in at least two obvious ways, i.e. by using different pitches in the winglets and/or by altering their size. The important thing is that, when the lure is pulled, the water flow alternates between a freer and a more restricted flow, so that this variation causes varying lateral forces on the axle 9 and the rear end of the lure. The result is a lure motion resembling the swimming movements of a small fish.

Similarly, the above only describes an alternative, in which the winglets 11 and 12 are located at the trailing end of the lure relative to the direction of travel. Nothing, however, prevents the winglets being located at the front of the lure in the direction of travel. A logical construction would then be one in which the axle 9 runs straight ahead and the line is attached to a loop or similar attachment point at the end of the axle. As there is a constant pull on the lure from the line, this would appear to equalize to some extent the movements caused by the winglets, though the movements are essentially the same as when the winglets are located at the rear of the lure. It can even be assumed that the winglets cause clear movements in the rear end of the lure too, especially if the body is made relatively light.

The invention claimed is:

1. A spinning, wobbler fishing lure, comprising:

a. a wobbling front body, the body having a front end and a rear end, the front end of the body having a front loop adapted to be connectible to a fishing line, the rear end of the body having a rear loop, the body being non-spinning, the body having an oval configuration, and wherein the front end of the front body is wider than the rear end of the front body so that the rear end may wobble in relation to the front end;

b. a rear axle constructed of a wire-like material and having a front end with a front loop and a rear end with a rear loop, the front loop of the rear axle being connected to the rear loop of the body so that the axle may freely articulate relative to the body and wobble;

c. a pair of winglets rotatably disposed adjacent to each other on the rear axle, each winglet having a unitary, one-piece construction with a proximal end and a distal end, and including:

i. a collar shaped base rotatably coupled about the axle, the base being disposed at the proximal end of the winglet, ii. a single blade extending distally from the base and having a predetermined pitch, the blade having a quarter-circle shape when viewed from the rear loop of the axle, iii. the winglets having substantially the same size as each other, the pitches of the winglets being substantially the same, but disposed in opposite directions whereby the winglets rotate at substantially the same speed when the lure is in operation, but in opposing directions;

iv. wherein the collar shaped base has a longitudinal length and the blade has a radial length, and wherein the longitudinal length of the base is less than the radial length of the blade; and v. wherein the base is part of the unitary winglet body;

d. wherein the winglets have concave sides and wherein the concave sides of both winglets face towards the front loop;

e. wherein the pair of winglets are disposed immediately adjacent to each other, without any separating member disposed between them;

f. whereby a widest part of the front end, is farthest from the rear axle and the winglets thus provide a strong lateral movement to the rear axle, which then increase and decrease rapidly with pulses from the winglets caused by the rotational movement of the winglets, to provide a natural, fish-like movement to the lure;

g. wherein, during use, the flow of water over the pair of winglets, each having the quarter-circle shape, causes the winglets to move through the following sequential states when viewed from the rear of the lure: (1) a first state wherein the winglets are aligned substantially opposite one another to form two quarter circles, (2) the flow of water over the winglets causing the winglets to rotate towards each other to a second state wherein the winglets form a semicircle, (3) the flow of water next causing the winglets to rotate to a third state wherein the winglets are aligned to form a single quarter circle, (4) the flow of water next causing the winglets to rotate to a fourth state wherein the winglets form a semicircle opposite that of the second state, and (5) the flow of water next causing the winglets to rotate to a fifth state wherein the winglets are again aligned opposite one another to form two quarter circles;

h. at least one body hook attached to the body; and
i. whereby the opposing rotation of the two adjacent, same sized, same but oppositely pitched winglets on the freely articulating rear axle pulses the front body sideward causing the rear end of the body to turn and also the rear axle to turn in the opposite direction of the front body.

\* \* \* \* \*